(12) United States Patent
Aizawa

(10) Patent No.: US 7,679,289 B2
(45) Date of Patent: Mar. 16, 2010

(54) FLAT FLUORESCENT LAMP HAVING GROOVES

(75) Inventor: Masanobu Aizawa, Yokohama (JP)

(73) Assignee: LG Display Co., Ltd., Seoul (KR)

(*) Notice: Subject to any disclaimer, the term of this patent is extended or adjusted under 35 U.S.C. 154(b) by 17 days.

(21) Appl. No.: 10/544,834

(22) PCT Filed: Dec. 8, 2004

(86) PCT No.: PCT/JP2004/018314
§ 371 (c)(1),
(2), (4) Date: Jul. 14, 2006

(87) PCT Pub. No.: WO2005/055273
PCT Pub. Date: Jun. 16, 2005

(65) Prior Publication Data
US 2006/0255737 A1 Nov. 16, 2006

(30) Foreign Application Priority Data
Dec. 8, 2003 (JP) .............................. 2003-436375

(51) Int. Cl.
H01J 17/16 (2006.01)
H01J 11/00 (2006.01)

(52) U.S. Cl. ...................................... 313/634; 313/567

(58) Field of Classification Search .................. 313/634
See application file for complete search history.

(56) References Cited

U.S. PATENT DOCUMENTS

| 5,387,921 A | 2/1995 | Zhang et al. |
| 5,808,418 A | 9/1998 | Pitman et al. |
| 6,127,780 A * | 10/2000 | Winsor ......................... 315/56 |

(Continued)

FOREIGN PATENT DOCUMENTS

EP 1 351 275 10/2003

(Continued)

*Primary Examiner*—Toan Ton
*Assistant Examiner*—Britt Hanley
(74) *Attorney, Agent, or Firm*—McKenna Long & Aldridge LLP

(57) ABSTRACT

A flat fluorescent lamp is disclosed, wherein rows of U-shaped grooves are formed in a front glass substrate, rows of wavy parallel grooves are formed in a rear glass substrate, and the U-shaped grooves and the wavy parallel groves are made to be perpendicular to each other. Also, fluorescent substance coating films are interposed so as to be in contact with each other on the inner surfaces, and this realizes a structure resistant to an external air pressure. Furthermore, fluorescent discharge is produced inside a tunnel-shaped cavity between the rows of U-shaped grooves, and reduction in luminance at the lower side of the U-shaped grooves is compensated by illumination of the wall of the U-shaped grooves, where the reduction in brightness is due to non-illuminating sections being caused because the U-shaped grooves and the wavy parallel grooves are in contact with each other. Thus, a flat fluorescent lamp with uniform surface luminance is realized. Further, a heater wire is formed on the lower side in the lamp to heat and vaporize mercury received on the lower side in the lamp, realizing a flat fluorescent lamp capable of illuminating brightly even at a low temperature.

18 Claims, 3 Drawing Sheets

U.S. PATENT DOCUMENTS

| | | |
|---|---|---|
| 6,294,867 B1 | 9/2001 | Lynn |
| 6,545,410 B1 | 4/2003 | Wu et al. |
| 2001/0033483 A1 * | 10/2001 | Moore .................. 362/84 |

FOREIGN PATENT DOCUMENTS

| | | | |
|---|---|---|---|
| JP | 1-75958 | | 5/1969 |
| JP | 56-077725 | | 6/1981 |
| JP | 56-129063 | | 10/1981 |
| JP | 63-80461 | | 4/1988 |
| JP | 5-503607 | | 6/1993 |
| JP | 5-182638 | | 7/1993 |
| JP | 05-182638 | * | 7/1993 |
| JP | 8-273603 | | 10/1996 |
| JP | 2002-190276 | | 7/2002 |
| JP | 2004-134410 | | 4/2004 |
| JP | 2004-152775 | | 5/2004 |
| JP | 2004-158458 | | 6/2004 |
| WO | WO 92/02947 | * | 2/1992 |

* cited by examiner

FLAT FLUORESCENT LAMP HAVING GROOVES

This application claims the benefit of Japan Patent Application No. P2003-436375, filed on Dec. 8, 2003.

BACKGROUND OF THE INVENTION

1. Field of the Invention

The present invention relates to a backlight unit of an LCD device, the LCD device having a rear surface illuminated with the light of the backlight unit, so as to generate the luminance on a display surface of the LCD device, and more particularly, to a flat fluorescent lamp of a large-sized backlight unit used for a large-sized liquid crystal television.

2. Discussion of the Related Art

In general, a backlight unit of an LCD device is formed of a plurality of cold-cathode fluorescent lamps and a light-guiding plate of acryl. In this backlight unit of the LCD device, the light may be lost due to the light-guiding plate. Also, the number of cold-cathode fluorescent lamps may be increased in the large-sized LCD device. A flat fluorescent lamp provided with one lamp can not be applicable to a practical use. For example, the flat fluorescent lamp for the LCD device, disclosed in [New Product Topic] (p. 21) of Nikkei Hi-tech Report dated on Jul. 2, 1990, can be fabricated in type of 1-inch. However, if the flat fluorescent lamp is fabricated in type of 5-inch, it has a problem in that it can not be resistant to an external air pressure.

SUMMARY OF THE INVENTION

Accordingly, the present invention is directed to a flat fluorescent lamp that substantially obviates one or more problems due to limitations and disadvantages of the related art.

An object of the present invention is to provide a flat fluorescent lamp suitable for being resistant to an external air pressure, obtaining a uniform display luminance, and realizing a high luminance even at a low temperature.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flat fluorescent lamp includes a front glass substrate in shape of rectangle, provided with a plurality of rows of U-shaped grooves formed in the predetermined portions except the circumference of the front glass substrate and the portion for forming members such as cylindrical electrodes, and a fluorescent substance coating film formed on the inner surface of the front glass substrate except the circumference; a rear glass substrate in shape of rectangle, provided with the plurality of rows of wavy parallel grooves formed in the predetermined portions except the circumference of the rear glass substrate and the portion for forming members such as the cylindrical electrodes, and a fluorescent substance coating film formed on the inner surface of the rear glass substrate except the circumference; and a sealed body formed by welding the circumference of the front and rear glass substrates in state of being inserted to a glass frame having an exhaust pipe after coupling the front and rear glass substrates in state the U-shaped grooves are in perpendicular to the wavy parallel grooves, and the U-shaped grooves and the wavy parallel grooves are in contact with each other by interposing the fluorescent substance coating films, wherein, on providing the sealed body in state of positioning the U-shaped grooves in horizontal, the exhaust pipe is sealed to the upper side of the glass frame, a plurality of introduction wires for lighting being welded to a plurality of groups of cylindrical electrodes are sealed to the lateral side of the glass frame, each of the introduction wires for lighting inserted to a tunnel shaped cavity formed between the rows of the U-shaped grooves, and one or a plurality of groups of introduction wires for heater is provided in the lower side of the glass frame, the introduction wires for heater being connected with a heater wire.

To realize the flat fluorescent lamp having the structure resistant to the external air pressure, the flat fluorescent lamp includes the front glass substrate in shape of rectangle, provided with the plurality of rows of U-shaped grooves formed in the predetermined portions except the circumference of the front glass substrate and the portion for forming members such as cylindrical electrodes, and the fluorescent substance coating film formed on the inner surface of the front glass substrate except the circumference; the rear glass substrate in shape of rectangle, provided with the plurality of rows of wavy parallel grooves formed in the predetermined portions except the circumference of the rear glass substrate and the portion for forming members such as the cylindrical electrodes, and the fluorescent substance coating film formed on the inner surface of the rear glass substrate except the circumference; and the sealed body formed by welding the circumference of the front and rear glass substrates in state of being inserted to the glass frame having the exhaust pipe after coupling the front and rear glass substrates in state the U-shaped grooves are in perpendicular to the wavy parallel grooves, and the U-shaped grooves and the wavy parallel grooves are in contact with each other by interposing the fluorescent substance coating films.

To realize the flat fluorescent lamp having the uniform rear luminance, the plurality of introduction wires for lighting being welded to the plurality of groups of cylindrical electrodes are sealed to the lateral side of the glass frame, each of the introduction wires for lighting inserted to the tunnel-shaped cavity formed between the rows of the U-shaped grooves, so illuminating the fluorescent substance coating films in the tunnel-shaped cavity when applying a voltage to the introduction wire for lighting, wherein it is possible to compensate for the decrease of luminance in the lower side of the U-shaped grooves with the luminescence in the wall of the U-shaped grooves.

To realize the flat fluorescent lamp illuminating brightly at the low temperature, one or a plurality of groups of introduction wires for heater are provided to the lower side of the glass frame, wherein the mercury of the lower side of the lamp is heated and vaporized at the temperature below 0° C., so the fluorescent substance coating film is illuminated brightly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
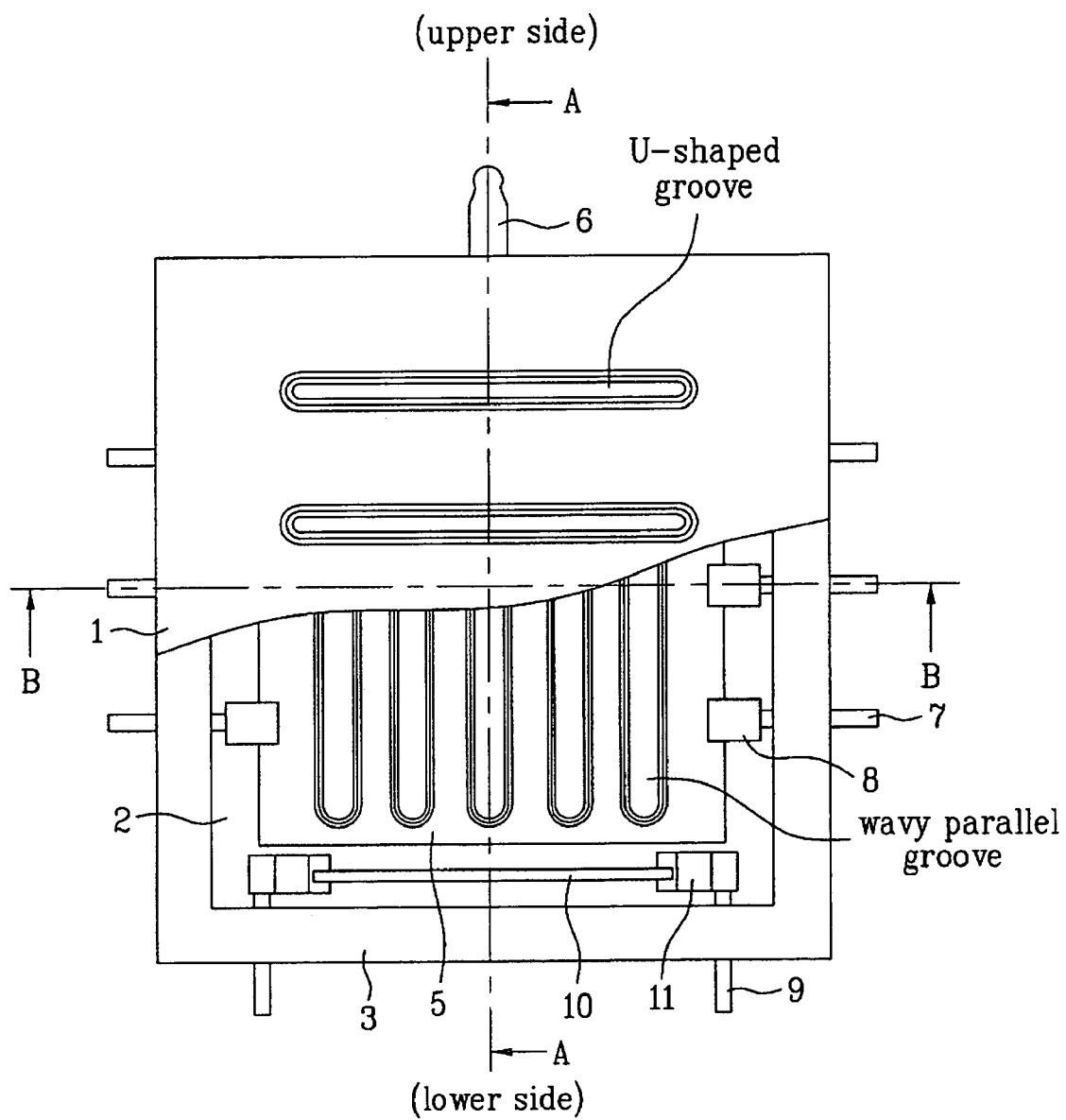
FIG. 1 is a plane view of a flat fluorescent lamp according to the first embodiment of the present invention.

Best Mode for Carrying Out the Invention

Reference will now be made in detail to the preferred embodiments of the present invention, examples of which are illustrated in the accompanying drawings. Wherever possible, the same reference numbers will be used throughout the drawings to refer to the same or like parts.

Hereinafter, a flat type fluorescent lamp according to the present invention will be described with reference to the accompanying drawings.

First, a flat-type fluorescent lamp according to the present invention is provided with a front glass substrate of a rectangular shape and a rear glass substrate of a rectangular shape, wherein the front glass substrate is coupled with the rear glass substrate. The peripheries of the front and rear glass substrates 1 and 2 are attached and welded together, with a glass frame 3 inserted there between, to form a sealed body, wherein other parts such as an exhaust pipe 6 are sealed to the glass frame 3. As a result, it is possible to form a sealed body with the front and rear glass substrates and the glass frame.

Specifically, the front glass substrate is provided with a plurality of rows of U shaped grooves in parallel. At this time, the U-shaped grooves are formed in the predetermined portions except the circumference of the front glass substrate and the portion for forming members such as cylindrical electrodes. Also, a fluorescent substance is coated on the inner surface of the front glass substrate except the circumference.

The rear glass substrate is provided with a plurality of rows of wavy parallel grooves. At this time, the wavy parallel grooves are formed in the predetermined portions except the circumference of the rear glass substrate and the portion for forming members such as the cylindrical electrodes. Also, a fluorescent substance is coated on the inner surface of the rear glass substrate except the circumference.

On coupling the front and rear glass substrates, the U-shaped grooves are in perpendicular to the wavy parallel grooves, whereby the U-shaped grooves and the wavy parallel grooves are in contact with each other in state of interposing the fluorescent substance coating films.

When the sealed body is provided in state of positioning the U-shaped grooves in horizontal, the exhaust pipe is sealed to the upper side of the glass frame. Also, a plurality of wires for lighting are sealed to the lateral side of the glass frame, wherein a plurality of groups of cylindrical electrodes are welded to the wires for lighting. Each of the wires is inserted to a tunnel-shaped cavity formed between the U-shaped grooves. Then, one or a plurality of groups of introduction wires for heater is provided in the lower side of the glass frame, wherein the introduction wires for heater are connected with a heater wire.

As a result, the flat fluorescent lamp according to the present invention obtains the aforementioned structure resistant to an external air pressure. Also, it is possible to obtain a uniform display luminance on the flat fluorescent lamp according to the present invention. In addition, the flat fluorescent lamp according to the present invention can illuminate brightly even at a low temperature.

First Embodiment

Figure 2:
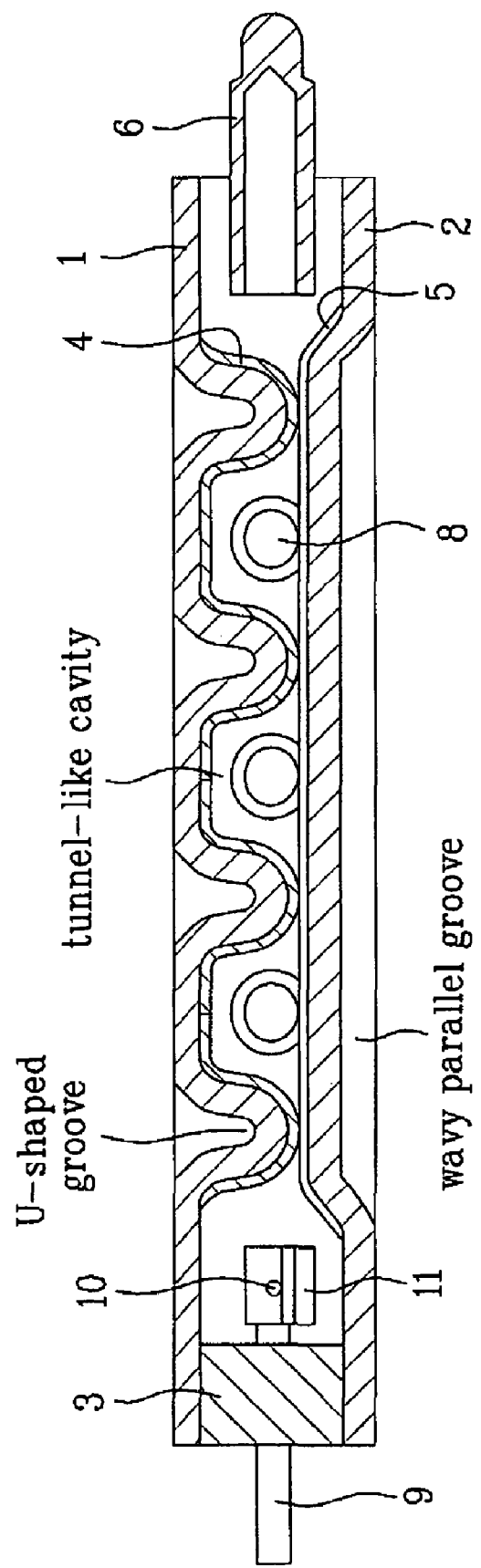
FIG. 2 is a cross sectional view taken along A-A in FIG. 1.
Figure 3:
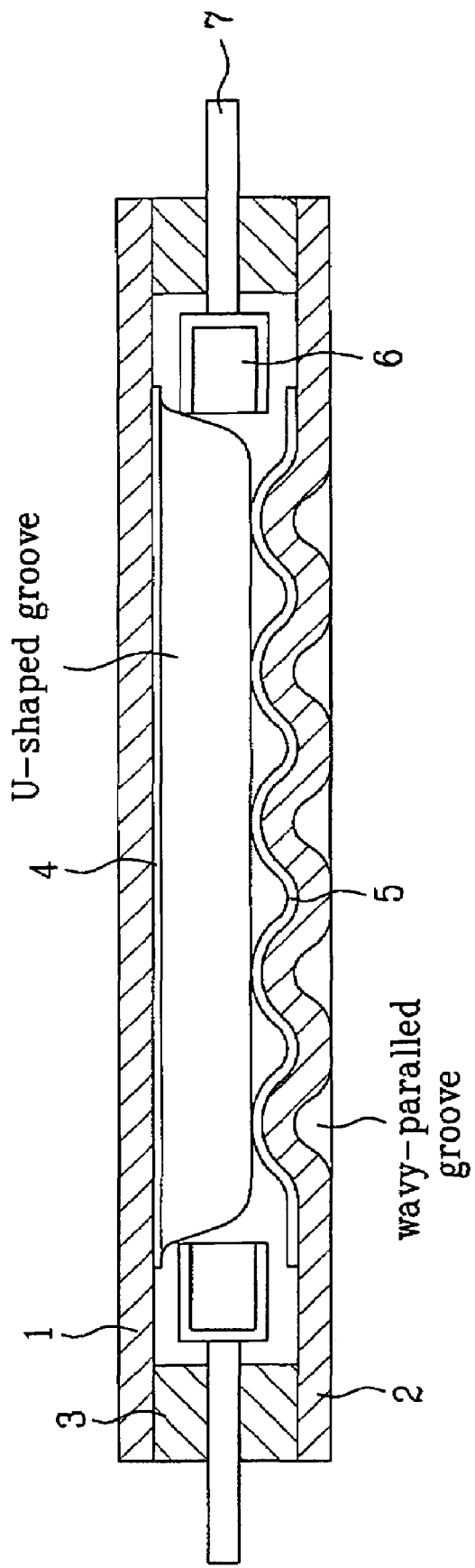
FIG. 3 is a cross sectional view taken along B-B in FIG. 1.

As shown in FIG. 1, FIG. 2 and FIG. 3, a flat fluorescent lamp according to the first embodiment of the present invention is provided with a front glass substrate 1 and a rear glass substrate 2, wherein the front glass substrate 1 is coupled with the rear glass substrate 2. The peripheries of the front and rear glass substrates 1 and 2 are attached and welded together, with a glass frame 3 inserted there between, to form a sealed body, wherein members such as exhaust pipe 6 are sealed to the glass frame 3. As a result, it is possible to form a sealed body with the front and rear glass substrates 1 and 2 and the glass frame 3.

Specifically, the front glass substrate 1 is provided with a plurality of rows of U-shaped grooves in parallel. At this time, the U-shaped grooves are formed in the predetermined portions except the circumference of the front glass substrate 1 and the portion for forming members such as cylindrical electrodes 8. Also, a fluorescent substance coating film 4 is formed on the inner surface of the front glass substrate 1 except the circumference.

The rear glass substrate 2 is provided with a plurality of rows of wavy parallel grooves. At this time, the wavy parallel grooves are formed in the predetermined portions except the circumference of the rear glass substrate 2 and the portion for forming members such as the cylindrical electrodes 8. Also, a fluorescent substance coating film 5 is formed on the inner surface of the rear glass substrate 2 except the circumference.

On coupling the front and rear glass substrates 1 and 2, the U-shaped grooves are in perpendicular to the wavy parallel grooves, whereby the U-shaped grooves and the wavy parallel grooves are in contact with each other in state of interposing the fluorescent substance coating films 4 and 5.

When the sealed body is provided in state of positioning the U-shaped grooves in horizontal, the exhaust pipe 6 is sealed to the upper side of the glass frame 3. Also, a plurality of wires 7 for lighting are sealed to the lateral side of the glass frame 3, wherein a plurality of groups of cylindrical electrodes 8 are welded to the wires 7 for lighting. Each of the wires 7 is inserted to a tunnel-shaped cavity formed between the U-shaped grooves. Then, one or a plurality of groups of introduction wires 9 for heater is provided in the lower side of the glass frame 3, wherein the introduction wires 9 for heater are connected with a heater wire 10.

As a result, the flat fluorescent lamp according to the present invention obtains the aforementioned structure resistant to an external air pressure. Also, it is possible to obtain a uniform display luminance on the flat fluorescent lamp according to the present invention. In addition, the flat fluorescent lamp according to the present invention can illuminate brightly even at a low temperature.

Furthermore, when welding or adhering the circumference of the glass substrates to each other for formation of the sealed body, it is preferable to use frit glass. In the flat fluorescent lamp according to the first embodiment of the present invention, the U-shaped groove is deeper than the wavy parallel groove in the predetermined thickness range of the sealed body, whereby the tunnel-shaped cavity has the large cross section.

The flat fluorescent lamp according to the first embodiment of the present invention has the structure resistant to the external air pressure. In more detail, the structure of the flat fluorescent lamp according to the first embodiment of the present invention will be described as shown in FIG. 1, FIG. 2 and FIG. 3.

The front glass substrate 1 is provided with the plurality of rows of U-shaped grooves in parallel. At this time, the U-shaped grooves are formed in the predetermined portions except the circumference of the front glass substrate 1 and the portion for forming members such as cylindrical electrodes 8. Also, the fluorescent substance coating film 4 is formed on the inner surface of the front glass substrate 1 except the circumference.

The rear glass substrate 2 is provided with the plurality of rows of wavy parallel grooves. At this time, the wavy parallel grooves are formed in the predetermined portions except the circumference of the rear glass substrate 2 and the portion for forming members such as the cylindrical electrodes 8. Also, the fluorescent substance coating film 5 is formed on the inner surface of the rear glass substrate 2 except the circumference.

On coupling the front and rear glass substrates 1 and 2, the U-shaped grooves are in perpendicular to the wavy parallel grooves, whereby the U-shaped grooves and the wavy parallel grooves are in contact with each other in state of interposing the fluorescent substance coating films 4 and 5.

Then, the members such as the exhaust pipe 6 are sealed to the glass frame 3, and the circumferences of the front and rear glass substrates 1 and 2 are welded in state of being inserted to the glass frame 3, thereby forming the sealed body.

In the flat fluorescent lamp according to the first embodiment of the present invention, it is possible to reinforce the front glass substrate 1 with the plurality of rows of U-shaped grooves. Also, the rear glass substrate 2 is reinforced with the plurality of rows of the wavy parallel grooves. The U-shaped grooves are in perpendicular to the wavy parallel grooves, whereby the U-shaped grooves and the wavy parallel grooves are in contact by forming the fluorescent substance coating films 4 and 5. Thus, the capacity to resist the pressure in the sealed body is improved. As a result, it is possible to form the flat fluorescent lamp having the structure resistant to the external air pressure.

Referring to FIG. 1 and FIG. 2, preferably, the exhaust tube 6 is provided in the upper side of the glass frame 3. Also, the exhaust tube 6 is formed of glass. The exhaust tube 6 serves as the exhaust of the flat fluorescent lamp, wherein the exhaust tube 6 is filled with an inert gas (not shown) such as neon or argon and mercury (not shown). In this state, since the exhaust tube 6 is provided in the upper side of the glass frame 3, it is possible to prevent the stay of mercury in the exhaust tube 6. At this time, the exhaust tube 6 shown in FIG. 1 and FIG. 2 corresponds to a type of seal.

To realize the flat type fluorescent lamp having the uniform display luminance, as shown in FIG. 1, FIG. 2 and FIG. 3, the three groups of introduction wires 7 welded to the cylindrical electrodes 8 are provided in the lateral side of the glass frame 3. That is, the tunnel-shaped cavity is provided between the two rows of U-shaped grooves, so as to form the introduction wires 7. In addition, three lighting devices (not shown) are provided to apply a voltage to the introduction wires 7. The fluorescent discharge is generated in the three rows in-between the three groups of cylindrical electrodes 8. That is, the glow discharge is started in the three rows through the tunnel-shaped cavity, whereby the mercury vapor generates ultraviolet rays. Thus, the fluorescent substance coating film 4, formed in the inner surface of the U-shaped groove, is luminescent. Simultaneously, the fluorescent substance coating film 5, formed in the inner surface of the wavy parallel groove, is luminescent.

In the contact portion of the U-shaped groove and the wavy parallel groove in state of interposing the fluorescent substance coating films 4 and 5, non-illuminating sections are generated in the fluorescent substance coating films 4 and 5. The non-illuminating sections cause the decrease of luminance in the lower side of the U shaped grooves. However, it is possible to compensate for the luminescence in the wall of the U-shaped grooves. As a result, it is possible to realize the flat fluorescent lamp having the uniform display luminance. At this time, when increasing the size of the flat fluorescent lamp, it is necessary to increase the rows of the U-shaped grooves and the wavy parallel grooves, and the introduction wires 7 welded to the cylindrical electrodes 8.

As mentioned above, the U-shaped grooves are formed in the front glass substrate 1, since the U-shaped grooves are useful for the increase in width of the tunnel-shaped cavity. Also, each group of the introduction wire 7 welded to the cylindrical electrode 8 increases the illuminating portion of the fluorescent substance coating layers 4 and 5, thereby improving the luminous efficiency of the flat fluorescent lamp.

Also, in the predetermined thickness range of the sealed body, the U-shaped groove is deeper than the wavy parallel groove, thereby increasing the cross section of the tunnel-shaped cavity. As a result, it is possible to improve the luminous efficiency of the flat fluorescent lamp.

In data of documents (title unknown), a tube type fluorescent lamp is disclosed, wherein the tube type fluorescent lamp has a plurality of decreased portions (decreasing the diameter of the tube), so as to improve the luminance. In the flat fluorescent lamp according to the first embodiment of the present invention, the wavy parallel grooves are formed in the rear glass substrate 2, thereby improving the luminance. At this time, a light-diffusion sheet is formed on an entire surface of the flat fluorescent lamp, and a light-reflecting sheet is formed on the rear surface, thereby improving the luminous efficiency and obtaining the uniform display luminance.

In the meantime, the flat fluorescent lamp illuminated at the low temperature will be described as follows. In case the circumferential temperature is about 0° C., the flat fluorescent lamp is not illuminated brightly since the vaporized mercury is insufficient under 0° C. Thus, the ultraviolet rays is not sufficient in the inside of the lamp, and the fluorescent substance coating films 4 and 5 are not illuminated sufficiently. Especially, the vaporized mercury on turning-on the lamp is frozen on turning-off the lamp, whereby the mercury is kept in the lower side of the lamp. That is, the mercury is hardly left in the upper side of the lamp.

To realize the flat fluorescent lamp illuminating brightly at the low temperature, as shown in FIG. 1, FIG. 2 and FIG. 3, the introduction wires 9 for heater is provided in the lower side of the glass frame, wherein the introduction wires 9 for heater are connected with the heater wire 10. That is, a power is applied to the heater wire 10 through the introduction wires 9 for heater. On turning off the lamp, the mercury of the lower side is heated, whereby the mercury is vaporized sufficiently. As a result, it is possible to realize the flat fluorescent lamp illuminating brightly even at the low temperature. Also, when increasing the size of the lamp, the number of groups of the introduction wires 9 for heater may be increased.

As shown in FIG. 1 and FIG. 2, the heater wire 10 may be formed in a loop or a band shape. Preferably, a plate spring 11 is formed between the introduction wire 9 for heater and the heater wire 10, so as to prevent the connection of the introduction and heater wires from being loose. The heater wire may be formed of tungsten or molybdenum. Especially, it is preferable to form the heater wire of zirconium since zirconium generates the getter effect at a temperature between about 200° C. and 600° C.

As forming the heater wire of zirconium, it is possible to remove the residual noxious gas such as carbon dioxide and carbon monoxide and the moisture from the lamp by the getter effect, thereby improving the efficiency and quality in the flat fluorescent lamp according to the present invention.

As a result, the flat fluorescent lamp according to the present invention can realize the structure suitable for being resistant to an external air pressure, obtaining a uniform display luminance, and realizing a high luminance even at a low temperature.

INDUSTRIAL APPLICABILITY

The flat fluorescent lamp according to the present invention has the following advantages.

As the competition in development for the LCD device becomes keen in Korea, Japan and Taiwan, the industry fields of the LCD device and the backlight unit have been developed and researched actively. The production of the flat fluorescent lamp according to the present invention is very useful in many ways.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A flat-type fluorescent lamp comprising:
   a front glass substrate in shape of rectangle, provided with a plurality of rows of U-shaped grooves formed in predetermined portions except the periphery of the front glass substrate and a portion for forming members including cylindrical electrodes, and a fluorescent substance coating film formed on the inner surface of the front glass substrate except the periphery, wherein the predetermined portions are located in a central portion of the front glass substrate;
   a rear glass substrate in shape of rectangle, provided with a plurality of rows of wavy parallel grooves formed in predetermined portions except the periphery of the rear glass substrate and a portion for forming members including the cylindrical electrodes, and a fluorescent substance coating film formed on the inner surface of the rear glass substrate except the periphery, wherein the predetermined portions are located in a central portion of the rear glass substrate; and
   wherein the peripheries of the front and rear glass substrates are welded together, with a glass frame inserted therebetween, to form a sealed body, wherein the glass frame has an exhaust pipe, and wherein the glass substrates are coupled in state where the U-shaped grooves are perpendicular to the wavy parallel grooves, and wherein the U-shaped grooves and the wavy parallel grooves are in contact with each other by interposing the fluorescent substance coating films,
   wherein, on providing the sealed body in state of positioning the U-shaped grooves in horizontal, the exhaust pipe is sealed to the upper side of the glass frame, a plurality of lamp connectors being welded to a plurality of groups of cylindrical electrodes are sealed to the lateral side of the glass frame, each of the lamp connectors inserted to a tunnel-shaped cavity formed between the rows of the U-shaped grooves, and one or a plurality of groups of heater connectors are provided in the lower side of the glass frame, the heater connectors being connected with a heater wire,
   wherein the depth of the U-shaped grooves is greater than a depth of the wavy grooves.

2. A liquid crystal display (LCD) device having a flat-type fluorescent lamp as a backlight unit, the flat-type fluorescent lamp comprising:
   a first substrate having a plurality of substantially parallel U-shaped grooves in a central portion of the first substrate;
   a first fluorescent substance on an inner surface of the first substrate;
   a second substrate attached to the first substrate, the second substrate having a plurality of wavy substantially parallel grooves in a central portion of the second substrate aligned substantially perpendicular to the U-shaped grooves; and
   a second fluorescent substance on an inner surface of the second substrate, the second fluorescent substance contacting the first fluorescent substance at predetermined positions due to contours of the U-shaped and wavy parallel grooves,
   wherein the depth of the U-shaped grooves is greater than a depth of the wavy grooves.

3. The LCD device according to claim 2, wherein the first substrate is made of glass.

4. The LCD device according to claim 3, further comprising a glass frame inserted between peripheries of the first and second substrate to form a sealed body.

5. The LCD device according to claim 4, further comprising an exhausting pipe sealed to one side of the glass frame.

6. The LCD device according to claim 2, wherein a plurality of tunnel-shaped cavities are formed between the two neighboring U-shaped grooves.

7. The LCD device according to claim 6, wherein a pair of lamp connectors is provided at both ends of each tunnel-shaped cavity to generate a fluorescent discharge.

8. The LCD device according to claim 7, wherein each lamp connector is connected to a cylindrical electrode.

9. The LCD device according to claim 2, further comprising a heater provided at one side of the attached first and second substrates.

10. The LCD device according to claim 9, wherein the heater includes a heater wire connected to at least two heater connectors.

11. The LCD device according to claim 10, further comprising a plate spring to secure the heater connectors and the heater wire.

12. The LCD device according to claim 10, wherein the heater wire is aligned parallel with the U-shaped grooves.

13. The LCD device according to claim 10, wherein the heater wire includes zirconium.

14. The LCD device according to claim 2, further comprising a light diffusion sheet on an outer surface of the first substrate.

15. The LCD device according to claim 14, further comprising a light reflection sheet on an outer surface of the second substrate.

16. The LCD device according to claim 4, wherein frit glass is used to attach the first and second substrates.

17. The LCD device according to claim 5, wherein the exhausting pipe is made of glass.

18. The LCD device according to claim 4, wherein the sealed body includes an inert gas and mercury.

* * * * *